US00RE49296E

(19) United States
(12) Reissued Patent
Liu

(10) Patent Number: US RE49,296 E
(45) Date of Reissued Patent: Nov. 15, 2022

(54) LIQUID CRYSTAL DISPLAY MODULE COMPRISING AN ADHESIVE FRAME HAVING CARRYING SECTIONS AND LIMITING SECTIONS AND DISPLAY DEVICE

(71) Applicants: Hisense Visual Technology Co., Ltd., Shandong (CN); Hisense USA Corp., Suwanee, GA (US); Hisense International Co., Ltd., Shandong (CN)

(72) Inventor: Hao Liu, Shandong (CN)

(73) Assignees: Hisense Visual Technology Co., Ltd., Qingdao (CN); Hisense USA Corporation, Suwanee, GA (US); Hisense International Co., Ltd., Shandong (CN)

(21) Appl. No.: 16/058,714

(22) Filed: Aug. 8, 2018

Related U.S. Patent Documents

Reissue of:
(64) Patent No.: 9,606,387
Issued: Mar. 28, 2017
Appl. No.: 14/730,988
Filed: Jun. 4, 2015

(30) Foreign Application Priority Data

Dec. 8, 2014 (CN) ..... 201410747432.9

(51) Int. Cl.
*G02F 1/1333* (2006.01)
*G02F 1/1345* (2006.01)

(52) U.S. Cl.
CPC ..... *G02F 1/1333* (2013.01); *G02F 1/1345* (2013.01)

(58) Field of Classification Search
CPC ..... G02F 1/133308; G02F 1/13452; G02F 2001/13332; G02F 2001/133317; G02F 2001/133308; G02F 2001/13452
USPC ..... 362/632; 349/58
See application file for complete search history.

(56) References Cited

U.S. PATENT DOCUMENTS 9,459,501 B2 * 10/2016 Sakamoto ..... G02F 1/13452
2007/0117418 A1 5/2007 Azuma et al.
2011/0128465 A1 6/2011 Park
(Continued)

FOREIGN PATENT DOCUMENTS

CN 102080788 A 6/2011
CN 103018937 A 4/2013

OTHER PUBLICATIONS

First Office Action dated Dec. 5, 2016 for Chinese Application No. 201410747432.9, and first Search Report; including English translation of Office Action; total 12 pages.

*Primary Examiner* — Henry N Tran
(74) *Attorney, Agent, or Firm* — Crowell & Moring LLP

(57) ABSTRACT

In a liquid crystal display module, notches are disposed on limiting sections and opposite to flexible circuit boards disposed on a liquid crystal panel so that the flexible circuit boards protrude through the notches and are bent toward the connecting sections; and moreover first depressed sections configured to accommodate the flexible circuit boards may be disposed on the connecting sections and opposite to the notches; and second depressed sections depressed inward may be disposed on the folded edge and opposite to the first depressed sections so that the first depressed sections and the second depressed sections cooperate with each other.

20 Claims, 6 Drawing Sheets

(56) References Cited

U.S. PATENT DOCUMENTS

| | | | | |
|---|---|---|---|---|
| 2011/0242458 | A1* | 10/2011 | Itakura | G02B 6/0073 349/65 |
| 2011/0292320 | A1* | 12/2011 | Yu | G02B 6/0086 349/63 |
| 2013/0083512 | A1 | 4/2013 | Park | |
| 2013/0169890 | A1* | 7/2013 | Kuromizu | G02F 1/13452 348/790 |
| 2014/0168565 | A1* | 6/2014 | Wu | G02B 6/0011 349/58 |
| 2015/0301391 | A1 | 10/2015 | Li | |

* cited by examiner

LIQUID CRYSTAL DISPLAY MODULE COMPRISING AN ADHESIVE FRAME HAVING CARRYING SECTIONS AND LIMITING SECTIONS AND DISPLAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This [application] *is a reissue of U.S. Pat. No. 9,606,387, issued on Mar. 28, 2017 from U.S. patent application Ser. No. 14/730,988, which* claims priority to Chinese Patent Application No. 201410747432.9[, and] filed with the State Intellectual Property Office of People's Republic of China on Dec. 8, 2014, the entire content of which is herein incorporated by reference.

FIELD

The present disclosure relates to the field of liquid crystal display technologies and particularly to a liquid crystal display module and a display device.

BACKGROUND

A liquid crystal display device has been widely applied to the fields of information technologies, multimedia technologies, etc., as a significant display device due to its low weight, small thinness, low power consumption, low radiation and other characteristics.

At present the liquid crystal display device becomes increasingly low in weight and small in thinness, and the structure of a liquid crystal display module is designed to be increasingly low in weight, small in thinness and increasingly compact.

SUMMARY

Some embodiments of the present disclosure provide a liquid crystal display module including a liquid crystal panel, an adhesive frame, and a backboard, herein:

flexible circuit boards are disposed on sides of the liquid crystal panel;

a folded edge facing the liquid crystal panel and configured to fix the adhesive frame are disposed on a periphery of the backboard;

the adhesive frame includes carrying sections parallel to a light incidence surface of the liquid crystal display module, limiting sections located above the carrying sections and perpendicular to the light incidence surface of the liquid crystal display module, and connecting sections disposed below the carrying sections and opposite to the limiting sections, herein the carrying sections are configured to support the liquid crystal panel, the limiting sections are configured to limit the liquid crystal panel to move in a plane horizontal to the light incidence surface of the liquid crystal display module, and the connecting sections are configured to cover an outside of the folded edge of the backboard, so that the adhesive frame and the backboard are fixed to each other;

notches are disposed on the limiting sections and opposite to the flexible circuit boards, the flexible circuit boards protrude the notches and are bent toward the connecting sections;

first depressed sections depressed inward are disposed on the connecting sections and opposite to the notches, and the first depressed is configured to accommodate the flexible circuit boards; and second depressed sections depressed inward are disposed on the folded edge opposite to the first depressed sections, so that the first depressed sections and the second depressed sections cooperate with each other.

Some embodiments of the present disclosure provide a display device including a liquid crystal display module including liquid crystal panel, an adhesive frame, and a backboard, herein:

flexible circuit boards are disposed on sides of the liquid crystal panel;

a folded edge facing the liquid crystal panel and configured to fix the adhesive frame are disposed on a periphery of the backboard;

the adhesive frame includes carrying sections parallel to a light incidence surface of the liquid crystal display module, limiting sections located above the carrying sections and perpendicular to the light incidence surface of the liquid crystal display module, and connecting sections disposed below the carrying sections and opposite to the limiting sections, herein the carrying sections are configured to support the liquid crystal panel, the limiting sections are configured to limit the liquid crystal panel to move in a plane horizontal to the light incidence surface of the liquid crystal display module, and the connecting sections are configured to cover an outside of the folded edge of the backboard, so that the adhesive frame and the backboard are fixed to each other;

notches are disposed on the limiting sections and opposite to the flexible circuit boards, the flexible circuit boards protrude the notches and are bent toward the connecting sections;

first depressed sections depressed inward are disposed on the connecting sections and opposite to the notches, and the first depressed is configured to accommodate the flexible circuit boards; and second depressed sections depressed inward are disposed on the folded edge opposite to the first depressed sections, so that the first depressed sections and the second depressed sections cooperate with each other.

BRIEF DESCRIPTION OF THE DRAWINGS

In order to make the technical solutions according to the some embodiments of the present disclosure more apparent, the drawings to which reference is made in the description of the embodiments will be described below briefly; and apparently the drawings in the following description illustrate only some of the embodiments of the present disclosure, and those ordinarily skilled in the art may further derive other drawings from these embodiments here without any inventive effort. In the drawings.

DETAILED DESCRIPTION OF THE EMBODIMENTS

Figure 1A:
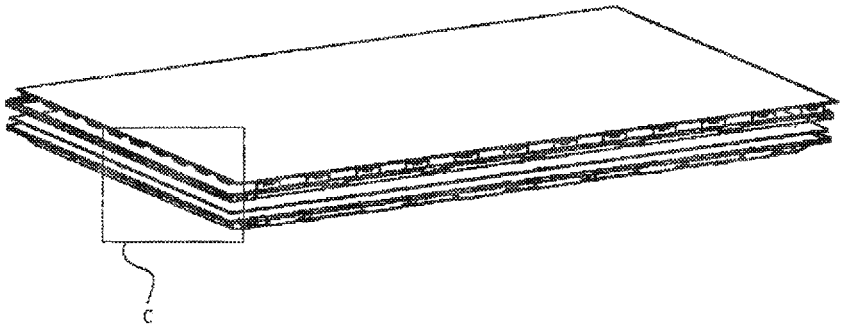
FIG. 1A illustrates an exploded view of a liquid crystal display module according to some embodiments of the present disclosure.

In order to make the objects, technical solutions and advantages of the present disclosure more apparent, the present disclosure will be described below in further details with reference to the drawings, and apparently the embodiments described below are only some but not all of the embodiments of the present disclosure. All the other embodiments which may occur to those ordinarily skilled in the art based upon the embodiments here of the present disclosure without any inventive effort shall fall into the scope of the present disclosure as claimed.

According to some exemplary embodiments of this disclosure, a liquid crystal display module may include a display panel, an adhesive frame, and a backboard, herein a folded edge facing the liquid crystal panel may be disposed on the periphery of the backboard. The adhesive frame may include carrying sections, parallel to a light incidence surface of the liquid crystal display module, configured to support the liquid crystal panel; limiting sections, located above the carrying sections and perpendicular to the light incidence surface of the liquid crystal display module, configured to limit the liquid crystal panel to move in a plane horizontal to the light incidence surface of the liquid crystal display module; and connecting sections, disposed below the carrying sections and [opposite] *corresponding* to the limiting sections, configured to cover the outside of the folded edge of the backboard, so that the adhesive frame and the backboard are fixed to each other. In order to enable the adhesive frame to cooperate with the liquid crystal panel disposed with flexible circuit boards, so that the flexible circuit boards are provided with an appropriate accommodating space, some embodiments of the present disclosure provide a liquid crystal display module. The liquid crystal panel may be disposed with the flexible circuit boards, and notches are disposed on the limiting sections and [opposite] *corresponding* to the flexible circuit boards, so that the flexible circuit boards protrude through the notches and are bent toward the connecting sections; and also first depressed sections configured to accommodate the flexible circuit boards may be disposed on the connecting sections and [opposite] *corresponding* to the notches; and second depressed sections depressed inward may be disposed on the folded edge and [opposite] *corresponding* to the first depressed sections, so that the first depressed sections and the second depressed sections cooperate with each other. With these cooperating structures, since both the first depressed sections and the second depressed sections face the inside of the display module, the flexible circuit boards may be accommodated without any increase the width of the front edge frame, and the first depressed sections and the second depressed sections enable good cooperation between the structural components, to thereby improve the stability and firmness of the liquid crystal display module.

The technical solution according to the present disclosure will be described below in connection with some embodiments thereof, but the present disclosure will not be limited to the following embodiments.

It shall be noted that some embodiments of the present disclosure are directed to a liquid crystal display module disposed with flexible circuit boards, so some embodiments of the present disclosure are focused on two sides of the liquid crystal display module on which the flexible circuit boards are disposed, and since the flexible circuit boards on the two sides may be disposed similarly, and the adhesive frame and the backboard may also be structured similarly, some embodiments of the present disclosure refer to only one of the sides of the liquid crystal display module by way of an example, but may also apply to the other side of the liquid crystal display module, although a repeated description thereof will be omitted here.

Figure 1B:
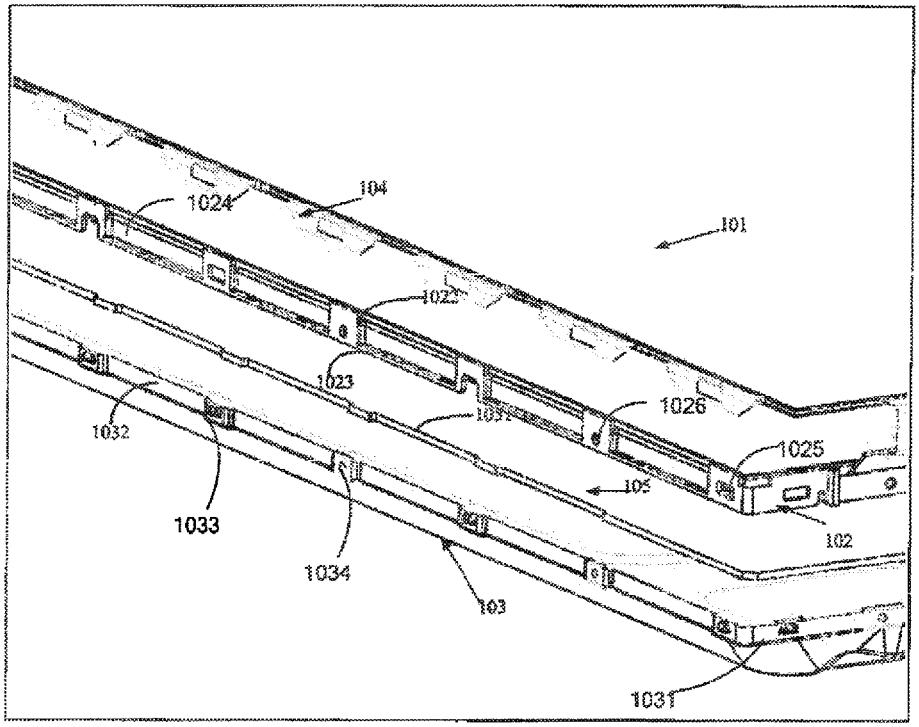
FIG. 1B illustrates an enlarged view of a partial structure in an area C in FIG. 1A.

FIG. 1A illustrates an exploded view of a liquid crystal display module according to some embodiments of the present disclosure; and FIG. 1B illustrates an enlarged view of a partial structure in an area C in FIG. 1A, and as illustrated in FIG. 1B, the liquid crystal display module may be structured as follows:

A liquid crystal panel 101, an adhesive frame 102, a backboard 103, and optical components 105 may be disposed in that order from the top to the bottom; a flexible circuit boards 104 may be disposed on a side of the liquid crystal panel 101; and a folded edge 1031 facing the liquid crystal panel 101 and configured to fix the adhesive frame 102 may be disposed on the periphery of the backboard 103. The "from the top to the bottom" refers to the direction in FIG. 1B.

Figure 1C:
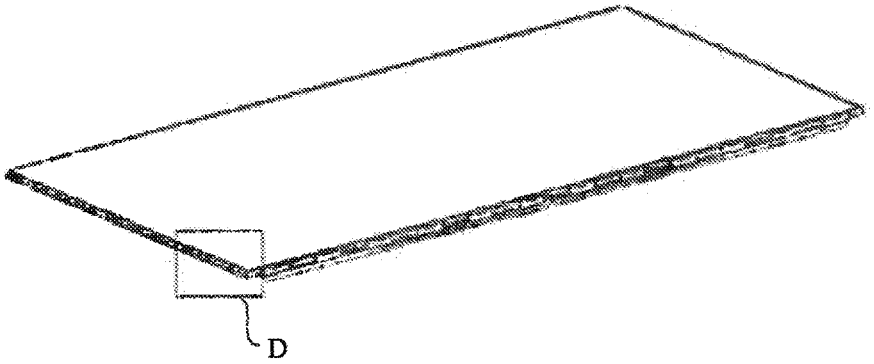
FIG. 1C illustrates a schematic diagram of the installed liquid crystal display module in FIG. 1A.
Figure 1D:
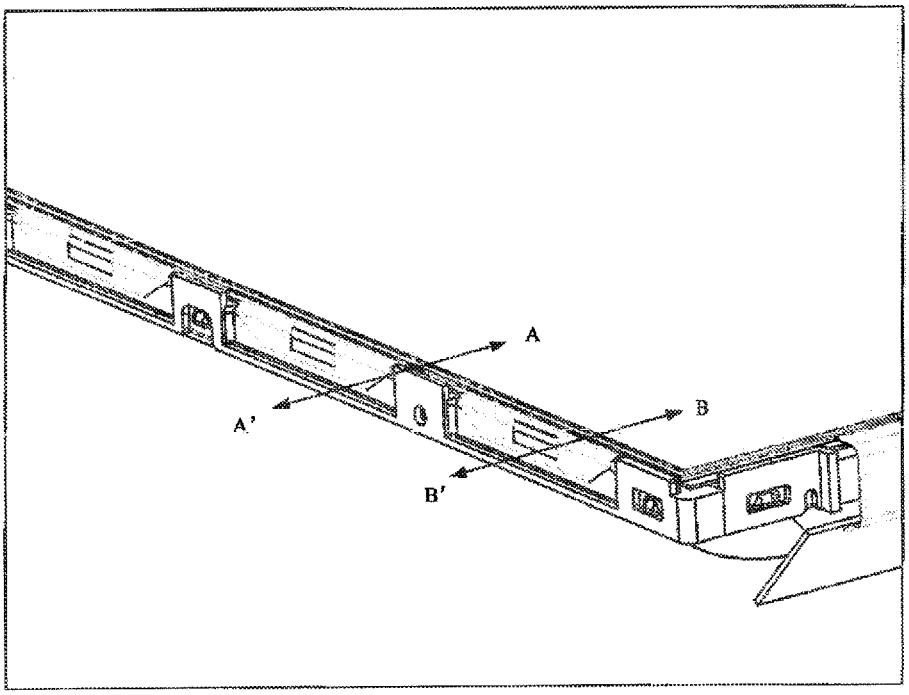
FIG. 1D illustrates an enlarged view of a structure in an area D in FIG. 1C.
Figure 2A:
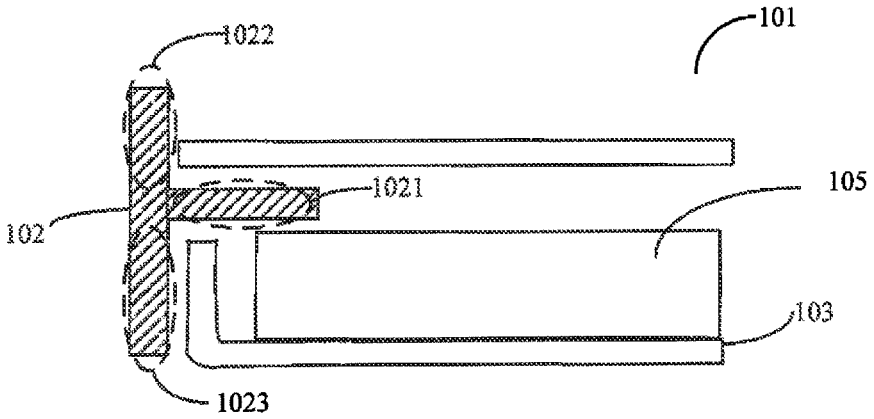
FIG. 2A illustrates a schematic sectional view along A-A' in FIG. 1D.

FIG. 1C illustrates a schematic structural diagram of an installed liquid crystal display module according to some embodiments of the present disclosure; FIG. 1D illustrates an enlarged view of a partial structure at D in FIG. 1A; and FIG. 2A and FIG. 2B illustrate sectional views of the structure of the liquid crystal display module taken along A-A' and B-B' of the installed liquid crystal display module in FIG. 1D.

As can be apparent from the figures above, the adhesive frame 102 may include carrying sections 1021 parallel to a light incidence surface of the liquid crystal display module, limiting sections 1022 located above the carrying sections 1021 and perpendicular to the light incidence surface of the liquid crystal display module, and connecting sections 1023 disposed below the carrying sections 1021 and [opposite] *corresponding* to the limiting sections 1022, where the carrying sections 1021 are configured to support the liquid crystal panel 102, the limiting sections 1022 are configured to limit the liquid crystal panel 101 to move in a plane horizontal to the light incidence surface of the liquid crystal display module, and the connecting sections 1023 are configured to cover the outside of the folded edge 1031 of the backboard 103, so that the adhesive frame 102 and the backboard 103 are fixed to each other.

Figure 2B:
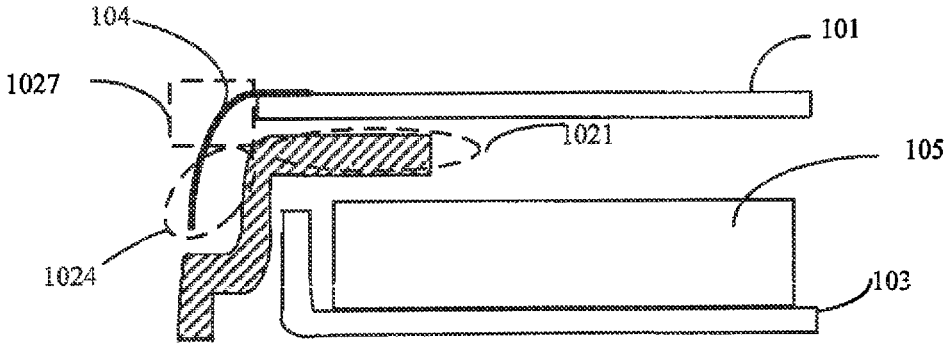
FIG. 2B illustrates a schematic sectional view along B-B' in FIG. 1D.

In some embodiments of the present disclosure, the flexible circuit boards may be disposed on the liquid crystal panel and [opposite] *corresponding* to B-B' of the adhesive frame, and as illustrated in FIG. 1D and FIG. 2B, in order to cooperate with the liquid crystal panel 101 disposed with the flexible circuit board 104, to thereby prevent a damage to the flexible circuit board 104 being adhered, notches 1027 may be disposed on the limiting sections 1022 of the adhesive frame and [opposite] *corresponding* to the flexible circuit boards 104, so that the flexible circuit boards 104 may protrude the notches and be bent toward the connecting sections 1023. The number of notches 1027 may be the same as the number of flexible circuit boards 104. Since the limiting sections 1022 are configured to limit the liquid crystal panel 101 to horizontal movement, if the notches 1027 were not disposed, then the limiting sections 1022 would extrude the flexible circuit boards 104 when the liquid crystal panel were placed on the carrying sections 1021, thus easily resulting in a damage to the flexible circuit boards 104; and also first depressed sections 1024 depressed inward are disposed on the connecting sections 1023 and [opposite] *corresponding* to the notches 1027 to accommodate the flexible circuit boards 104, so that the first depressed sections 1024 depressed inward are disposed on the limiting sections and [opposite] *corresponding* to the flexible circuit boards 104, to thereby reserve some accommodation spaces for the flexible circuit boards, so that the flexible circuit boards 104 may be placed in the first depressed sections 1024.

Moreover second depressed sections 1032 depressed inward may be disposed on the folded edge 1031 of the backboard 103 and [opposite] *corresponding* to the first depressed sections 1024, so that the first depressed sections 1024 and the second depressed sections 1032 cooperate with each other, to thereby enable the backboard and the adhesive frame to be adhered firmly.

Figure 3:
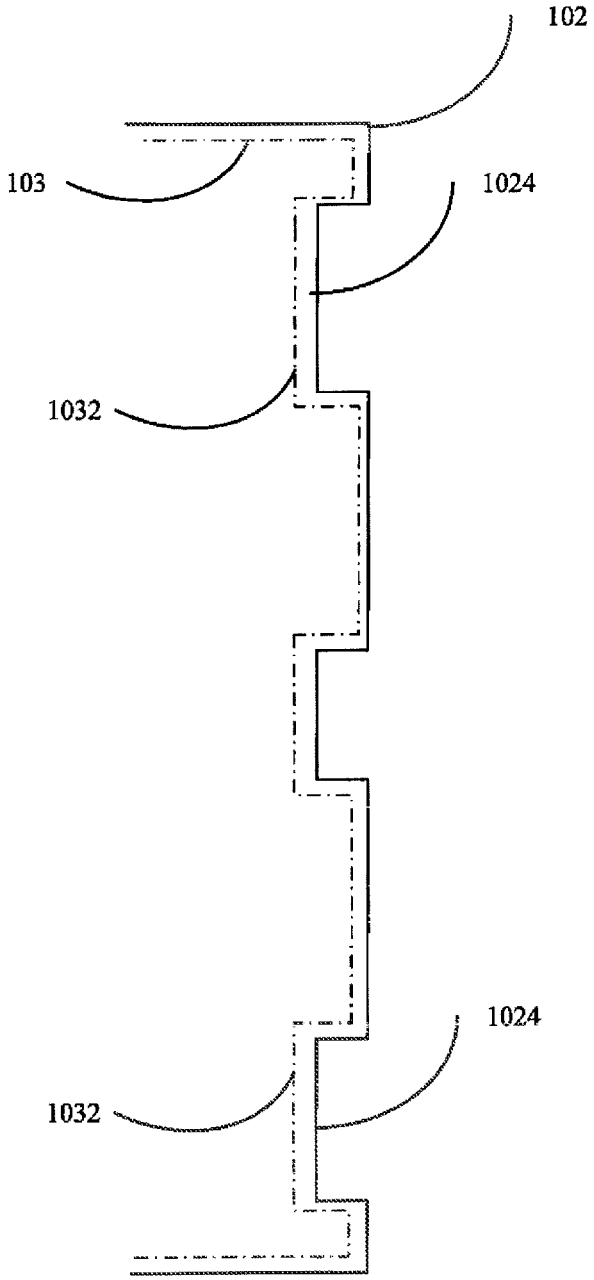
FIG. 3 illustrates a schematic diagram of a first depressed section and a second depressed section, both of which cooperate with each other.

FIG. 3 illustrates the first depressed sections and the second depressed sections, both of which cooperate with each other, where the second depressed sections 1032 in the backboard 103 are disposed [opposite] *corresponding* to the first depressed sections 1024 in the adhesive frame, and both the first depressed sections 1024 and the second depressed sections 1032 are depressed toward the inside of the display module and fit closely together, so that the flexible circuit boards 104 may be accommodated without any increase in width of the front end face in the embodiments of the present disclosure.

Figure 4:
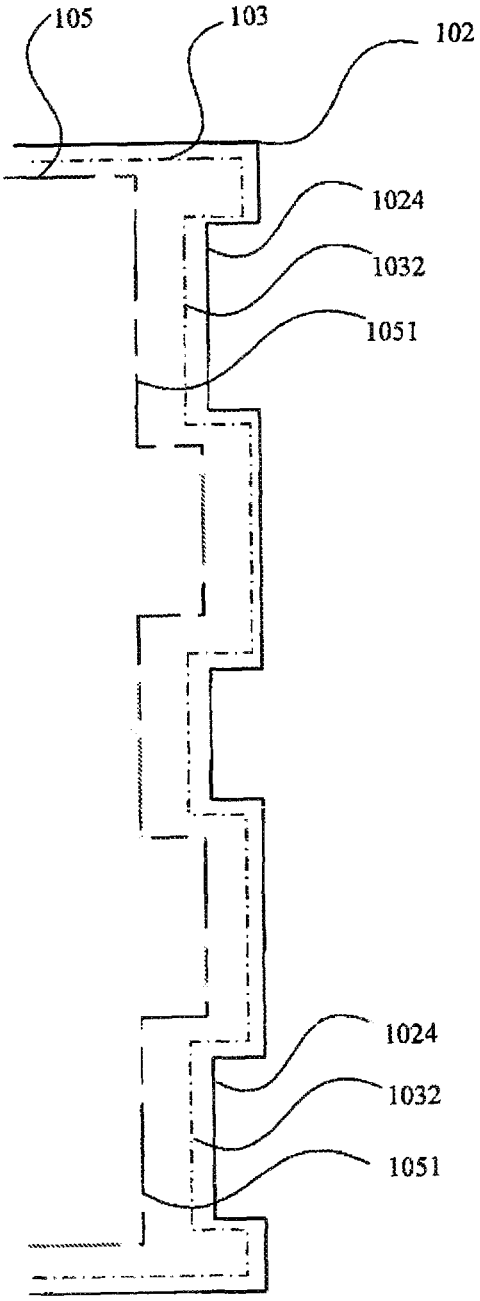
FIG. 4 illustrates a schematic diagram of a first depressed section, a second depressed section and a third depressed section, all of which cooperate with each other.

Moreover in some embodiments of the present disclosure, as illustrated in FIG. 1B, since the optical components 105 may be disposed between the backboard 103, and the carrying section 1021 of the adhesive frame 102, in order to cooperate with the second depressed sections 1032 of the backboard 103, and the first depressed sections 1024 of the adhesive frame 102, third depressed sections 1051 depressed inward may be disposed on the optical components 105 and [opposite] *corresponding* to the second depressed sections 1032, so that the third depressed sections 1051 may cooperate with the second depressed sections 1032 as illustrated in FIG. 4. Moreover, in view of some expansion gaps between the optical components, in order to enable the optical components to well match with the second depressed sections, the distances between the third depressed sections 1051 and the second depressed sections 1024 will be no smaller than the expansion gaps between the optical components.

In order to enable the first depressed sections 1024 to cooperate with the second depressed sections 1032, as illustrated in FIG. 1B and FIG. 1D, in some embodiments of the present disclosure, in the optical modules, at least one first buckle 1025 may be disposed in at least one position of the connecting section 1023 other than the first depressed section 1024, and at least one second buckle 1033 corresponding to the first buckle 1025 may be disposed in at least one position of the folded edge 1031 other than the second depressed sections 1032, and the at least one first buckle 1025 may be engaged with the at least one second buckle 1033, so that the adhesive frame 102 is fixed to the backboard 103 when they are assembled. For example, multiple first buckles 1025 may be disposed in the center of the positions other than the first depressed sections 1024, so that the first depressed sections 1024 and the first buckles 1025 are disposed alternately; and similarly multiple second buckles 1033 may be disposed in the center of the positions other than the second depressed sections 1032, so that the second depressed sections 1032 and the second buckles 1033 are disposed alternately. The first buckles 1025 and the second buckles 1033 disposed on correspondence may be engaged with each other, to thereby stabilize and firm the backboard 103 and the adhesive frame 102.

Moreover in some embodiments of the present disclosure, in the liquid crystal display, at least one first screwed hole 1026 may be disposed in at least one positions of the connecting sections 1023 module other than the first depressed section 1024 and the first buckle 1025, and at least one second screwed hole 1034 corresponding to the first screwed hole 1026 may be disposed in at least one positions on the folded edge 1031 other than the second depressed section 1024 and the second buckle 1033, and the first screwed hole 1026 and the second screwed hole 1034 are engaged with each other through a bolt, to thereby fix a back housing and/or a front housing to the liquid crystal display module.

Figure 5:
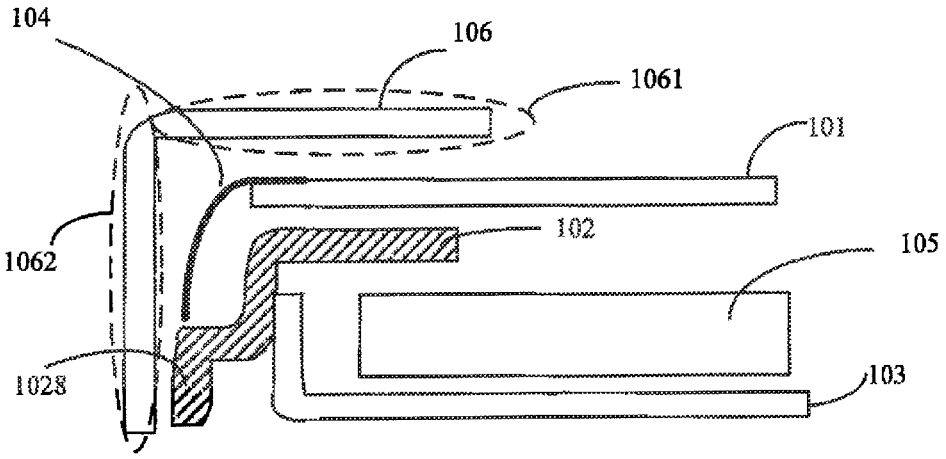
FIG. 5 illustrates a schematic sectional view of the position illustrated in FIG. 2B after a front housing is disposed at the position.

Moreover, in addition to the structure above, the liquid crystal display module may further include a front housing [105] *106*; and taking as an example a section of the position where a flexible circuit board is disposed, as illustrated in FIG. 5, the front housing 106 may include a front end face 1061 and a sidewall 1062, herein the front end face 1061 may be fit onto a light exit face of the liquid crystal panel 101, and in order to enable the front housing to be fixed to the liquid crystal panel, without any influence on a display area of the liquid crystal panel, the front end face may cover only an edge area of the liquid crystal panel. In some embodiments of the present disclosure, the inside of the sidewall 1062 may be fit onto the connecting sections 1023 in positions other than the first depressed sections 1024, and accommodation spaces to accommodate the flexible circuit boards 104 may be formed between the inside of the sidewall 1062 and the first depressed sections 1024 in the connecting section 1023, so that the flexible circuit boards 104 may be accommodated in the accommodation spaces.

In some embodiments of the present disclosure, protecting sections [1028] *1024* may be disposed on the sides, of the first depressed sections 1024 of the connecting sections 1023, away from the carrying sections. The protecting sections 1028 may be flushed with the connecting sections 1023. Steps may be formed by the protecting sections 1028 and the first depressed sections 1024, so that the first depressed sections with the front housing 106 being installed are enclosed to form closed spaces, to thereby prevent a damage to the flexible circuit board 104 from the outside.

In some embodiments of the present disclosure, the height of the folded edge 1031 may be no less than any one of the thicknesses of the optical components 105 in the direction perpendicular to the light incidence surface of the liquid crystal display module.

In order to enable the optical components 105 to be placed, the thickness of the folded edge 1031 of the backboard 103 may be sufficiently large and generally no less than any one of the thicknesses of the optical components in the direction perpendicular to the light incidence surface of the liquid crystal display module.

Figure 6:
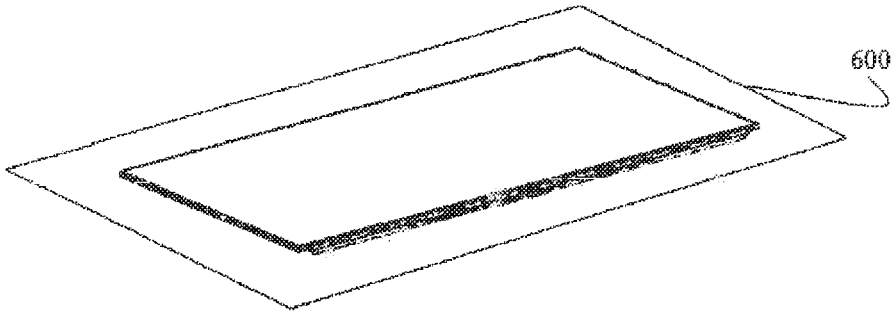
FIG. 6 illustrates a schematic diagram of a display device according to some embodiments of the present disclosure.

According to FIG. 6, some embodiments of the present disclosure further provide a display device 600 which may include a liquid crystal display module, and the liquid crystal display module may include a liquid crystal panel, an adhesive frame, and a backboard;

Flexible circuit boards are disposed on sides of the liquid crystal panel;

A folded edge facing the liquid crystal panel and configured to fix the adhesive frame are disposed on the periphery of the backboard;

The adhesive frame includes: carrying sections parallel to a light incidence surface of the liquid crystal display module, limiting sections located above the carrying sections and perpendicular to the light incidence surface of the liquid crystal display module, and connecting sections disposed below the carrying sections and [opposite] *corresponding* to the limiting sections, herein the carrying sections are configured to support the liquid crystal panel, the limiting sections are configured to limit the liquid crystal panel to move in a plane horizontal to the light incidence surface of the liquid crystal display module, and the connecting sections are configured to cover the outside of the folded edge of the backboard, so that the adhesive frame and the backboard are fixed to each other;

Notches are disposed on the limiting sections and [opposite] *corresponding* to the flexible circuit boards, so that the flexible circuit boards protrude the notches and are bent toward the connecting sections;

First depressed sections depressed inward are disposed on the connecting sections and [opposite] *corresponding* to the notches to accommodate the flexible circuit boards; and Second depressed sections depressed inward are disposed on the folded edge and [opposite] *corresponding* to the first depressed sections, so that the first depressed sections and the second depressed sections cooperate with each other.

In some embodiments of the present disclosure, the display device may further include optical components disposed between the backboard, and the carrying section of the adhesive frame, herein third depressed sections depressed inward are disposed on the optical components and [opposite] *corresponding* to the second depressed sections, so that the third depressed sections cooperate with the second depressed sections.

In some embodiments of the present disclosure, in the display device, distances between the third depressed sections and the second depressed sections are no less than expansion gaps between the optical components.

In some embodiments of the present disclosure, in the display device, at least one first buckle is disposed in at least one position of the connecting sections other than the first depressed section, and a second buckle corresponding to the first buckle is disposed in at least one position of the folded edge other than the second depressed sections, and the first buckle is engaged with the second buckle.

In some embodiments of the present disclosure, in the display device, at least one first screwed hole is disposed in at least one position of the connecting sections other than the first depressed section and the first buckle, and a second screwed hole is disposed on the folded edge and [opposite] *corresponding* to the first screwed hole.

In some embodiments of the present disclosure, the display device may further includes a front housing including a front end face and a sidewall, herein the front end face is fit onto a light exit face of the liquid crystal panel, and the inside of the sidewall is fit onto the connecting sections in the positions other than the first depressed sections, and accommodation spaces to accommodate the flexible circuit boards is formed between the inside of the sidewall and the first depressed sections.

In some embodiments of the present disclosure, in the display device, protecting sections are disposed on the sides, of the first depressed sections of the connecting sections, away from the carrying sections, and the protecting sections are flushed with the connecting sections, and steps are formed by the protecting sections and the first depressed sections, and the steps cooperate with the front housing, so that the first depressed sections with the front housing being installed are enclosed to form closed spaces.

In some embodiments of the present disclosure, in the display device, the height of the folded edge is no less than any one of the thicknesses of the optical components in the direction perpendicular to the light incidence surface of the liquid crystal display module.

In some embodiments of the present disclosure, in the display device, at least one first buckle is disposed in at least one position of the connecting sections other than the first depressed section, and a second buckle corresponding to the first buckle is disposed in at least one position of the folded edge other than the second depressed sections, and the first buckle is engaged with the second buckle.

In some embodiments of the present disclosure, in the display device, at least one first buckle is disposed in at least one position of the connecting sections other than the first depressed section, and a second buckle corresponding to the first buckle is disposed in at least one position of the folded edge other than the second depressed sections, and the first buckle is engaged with the second buckle.

With the liquid crystal display module with the flexible circuit boards disposed on the sides of the liquid crystal panel, the notches are disposed on the limiting sections of the adhesive frame and [opposite] *corresponding* to the flexible circuit boards, and the first depressed sections depressed inward to accommodate the flexible circuit boards are disposed on the connecting sections and [opposite] *corresponding* to the notches, so that the notches cooperate with the first depressed sections in such a way that the flexible circuit boards may protrude the notches and be bent toward the connecting sections; and the second depressed sections depressed inward may be disposed on the folded edge of the backboard and [opposite] *corresponding* to the first depressed sections, so that the second depressed sections cooperate in structure with the first depressed sections, in such a way that the flexible circuit boards may be accommodated in the liquid crystal display module, without any influence on the structural functions of the latter, and the backboard and the adhesive may cooperate firmly with each other through the first depressed sections and the second depressed sections, to thereby improve the stability and firmness of the liquid crystal display module.

Although some embodiments of the present disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the present disclosure.

Evidently those skilled in the art may make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

The invention claimed is:

1. A liquid crystal display module, comprising a liquid crystal panel, an adhesive frame, and a backboard, wherein the liquid crystal display module comprises:

flexible circuit boards, disposed on sides of the liquid crystal panel, a folded edge[, facing the liquid crystal panel,] disposed on a periphery of the backboard and configured to fix the adhesive frame, wherein the adhesive frame comprises carrying sections parallel to [a light incidence surface of] the liquid crystal [display module] *panel*, limiting sections located above the carrying sections and perpendicular to [the light incidence surface of] the liquid crystal [display module] *panel*, and connecting sections disposed below the carrying sections and [opposite] *corresponding* to the limiting sections, wherein the carrying sections are configured to support the liquid crystal panel, the limiting sections are configured to limit the liquid crystal panel to move in a plane [horizontal] *parallel* to [the light incidence surface of] the liquid crystal [display module] *panel*, and the connecting sections are configured to cover an outside of the folded edge of the backboard, so that the adhesive frame and the backboard are fixed to each other, wherein notches are disposed on the limiting sections and [opposite] *corresponding* to the flexible circuit boards, so that the flexible circuit boards protrude and are bent toward the connecting sections, first depressed sections depressed inward are disposed on the connecting section and [opposite] *corresponding* to the notches to accommodate the flexible circuit boards, and second depressed sections depressed inward are disposed on the folded edge and [opposite] *corresponding* to the first depressed sections, so that the first depressed sections and the second depressed sections cooperate with each other.

2. The liquid crystal display module according to claim 1, wherein the liquid crystal display module further comprises optical components disposed between the backboard, and the carrying section of the adhesive frame, wherein third depressed sections depressed inward are disposed on the optical components and [opposite] *corresponding* to the second depressed sections, so that the third depressed sections cooperate with the second depressed sections.

3. The liquid crystal display module according to claim 2, wherein distances between the third depressed sections and the second depressed sections are no less than expansion gaps between the optical components.

4. The liquid crystal display module according to claim [1] *2*, wherein at least one first buckle is disposed in at least one position of the connecting sections other than the first depressed section, and a second buckle corresponding to the first buckle is disposed in a position of the folded edge other than the second depressed sections, and the first buckle is engaged with the second buckle.

5. The liquid crystal display module according to claim 4, wherein at least one first screwed hole is disposed in at least one position of the connecting sections other than the first depressed section and the first buckle, and a second screwed hole is disposed on the folded edge and [opposite] *corresponding* to the first screwed hole.

6. The liquid crystal display module according to claim 5, further comprising a front housing comprising a front end face and a sidewall, wherein the front end face is fit onto a light exit face of the liquid crystal panel, and an inside of the sidewall is fit onto the connecting sections in positions other than the first depressed sections, and accommodation spaces to accommodate the flexible circuit boards is formed between the inside of the sidewall and the first depressed sections.

7. The liquid crystal display module according to claim 6, wherein protecting sections are disposed on sides, of the first depressed sections of the connecting sections, away from the carrying sections, and the protecting sections are flushed with the connecting sections, and steps are formed by the protecting sections and the first depressed sections, and the steps cooperate with the front housing, so that the first depressed sections with the front housing being installed are enclosed forming closed spaces.

8. The liquid crystal display module according to claim 6, wherein a height of the folded edge is no less than thicknesses of the optical components in [the] *a* direction perpendicular to [the light incidence surface of] the liquid crystal [display module] *panel*.

9. The liquid crystal display module according to claim 2, wherein at least one first buckle is disposed in at least one position of the connecting sections other than the first depressed section. and a second buckle corresponding to the first buckle is disposed in a position of the folded edge other than the second depressed sections, and the first buckle is engaged with the second buckle.

10. The liquid crystal display module according to claim 3, wherein at least one first buckle is disposed in at least one position of the connecting sections other than the first depressed section, and a second buckle corresponding to the first buckle is disposed in a position of the folded edge other than the second depressed sections, and the first buckle is engaged with the second buckle.

11. A display device, comprising a liquid crystal display module comprising a liquid crystal panel, an adhesive frame, and a backboard, wherein the liquid crystal display module comprises:

flexible circuit boards, disposed on sides of the liquid crystal panel, a folded edge[, facing the liquid crystal panel,] disposed on a periphery of the backboard and configured to fix the adhesive frame, wherein the adhesive frame comprises carrying sections parallel to [a light incidence surface of] the liquid crystal [display module] *panel*, limiting sections located above the carrying sections and perpendicular to [the light incidence surface of] the liquid crystal [display module] *panel*, and connecting sections disposed below the carrying sections and [opposite] *corresponding* to the limiting sections, wherein the carrying sections are configured to support the liquid crystal panel, the limiting sections are configured to limit the liquid crystal panel to move in a plane [horizontal] *parallel* to [the light incidence surface of] the liquid crystal [display module] *panel*, and the connecting sections are configured to cover an outside of the folded edge of the backboard, so that the adhesive frame and the backboard are fixed to each other, wherein notches are disposed on the limiting sections and [opposite] *corresponding* to the flexible circuit boards, so that the flexible circuit boards protrude and are bent toward the connecting sections, first depressed sections depressed inward are disposed on the connecting sections and [opposite] *corresponding* to the notches to accommodate the flexible circuit boards, and second depressed sections depressed inward are disposed on the folded edge and [opposite] *corresponding* to the first depressed sections, so that the first depressed sections and the second depressed sections cooperate with each other.

12. The display device according to claim 11, wherein the liquid crystal display further comprises optical components disposed between the backboard, and the carrying section of the adhesive frame, wherein third depressed sections depressed inward are disposed on the optical components and [opposite] *corresponding* to the second depressed sections, so that the third depressed sections cooperate with the second depressed sections.

13. The display device according to claim 12, wherein distances between the third depressed sections and the second depressed sections are no less than expansion gaps between the optical components.

14. The display device according to claim [11] *12*, wherein at least one first buckle is disposed in at least one position of the connecting sections other than the first depressed section, and a second buckle corresponding to the first buckle is disposed in a position of the folded edge other than the second depressed sections, and the first buckle is engaged with the second buckle.

15. The display device according to claim 14, wherein at least one first screwed hole is disposed in at least one position of the connecting sections other than the first depressed section and the first buckle, and a second screwed hole is disposed on the folded edge and [opposite] *corresponding* to the first screwed hole.

16. The display device according to claim 15, further comprising a front housing comprising a front end face and a sidewall, wherein the front end face is fit onto a light exit face of the liquid crystal panel, and an inside of the sidewall is fit onto the connecting sections in positions other than the first depressed sections, and accommodation spaces to accommodate the flexible circuit boards is formed between the inside of the sidewall and the first depressed sections.

17. The display device according to claim 16, wherein protecting sections are disposed on sides, of the first depressed sections of the connecting sections, away from the carrying sections, and the protecting sections are flushed with the connecting sections, and steps are formed by the protecting sections and the first depressed sections, and the steps cooperate with the front housing, so that the first depressed sections with the front housing being installed are enclosed forming closed spaces.

18. The display device according to claim 16, wherein a height of the folded edge is no less than thicknesses of the optical components in [the] *a* direction perpendicular to [the light incidence surface of] the liquid crystal [display module] *panel*.

19. The display device according to claim 12, wherein at least one first buckle is disposed in at least one position of the connecting sections other than the first depressed section, and a second buckle corresponding to the first buckle is disposed in a position of the folded edge other than the second depressed sections, and the first buckle is engaged with the second buckle.

20. The display device according to claim 13, wherein at least one first buckle is disposed in at least one position of the connecting sections other than the first depressed section, and a second buckle corresponding to the first buckle is disposed in a position of the folded edge other than the second depressed sections, and the first buckle is engaged with the second buckle.

* * * * *